(12) United States Patent
Xie

(10) Patent No.: US 9,933,670 B2
(45) Date of Patent: Apr. 3, 2018

(54) LIQUID CRYSTAL DISPLAY PANEL AND DISPLAY

(71) Applicants:Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Chang Xie, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 214 days.

(21) Appl. No.: 14/775,814

(22) PCT Filed: Aug. 21, 2015

(86) PCT No.: PCT/CN2015/087794
§ 371 (c)(1),
(2) Date: Sep. 14, 2015

(87) PCT Pub. No.: WO2017/020355
PCT Pub. Date: Feb. 9, 2017

(65) Prior Publication Data
US 2017/0139286 A1    May 18, 2017

(30) Foreign Application Priority Data
Jul. 31, 2015   (CN) .......................... 2015 1 0464920

(51) Int. Cl.
*G02F 1/1343*    (2006.01)
*G02F 1/1333*    (2006.01)
*G02F 1/1335*    (2006.01)

(52) U.S. Cl.
CPC .. *G02F 1/134363* (2013.01); *G02F 1/133345* (2013.01); *G02F 1/133514* (2013.01); *G02F 2201/121* (2013.01); *G02F 2201/123* (2013.01)

(58) Field of Classification Search
CPC .. G02F 1/134363; G02F 1/136; G02F 1/1368; G02F 1/133345; G02F 1/134309;
(Continued)

(56) References Cited

U.S. PATENT DOCUMENTS

2007/0085958 A1* 4/2007 Lin ................... G02F 1/134363
349/141

FOREIGN PATENT DOCUMENTS

CN         101976005 A      2/2011
CN         202285073 U      6/2012
(Continued)

OTHER PUBLICATIONS

08_20151224_ISR, dated Mar. 24, 2016, Chinese Patent Office.

*Primary Examiner* — Thoi Duong
(74) *Attorney, Agent, or Firm* — Andrew C. Cheng

(57) ABSTRACT

The present invention discloses a liquid crystal display panel and a display. The display panel comprises a first substrate and a second substrate opposed to each other, and a liquid crystal layer located between the first substrate and the second substrate. A first common electrode and an insulating layer are sequentially provided on the side of the first substrate toward the second substrate. Multiple first pixel electrodes are provided on the insulating layer. Multiple second common electrodes and multiple second pixel electrodes are provided on the side of the second substrate toward the first substrate. The second common electrodes and the second pixel electrodes are provided at intervals. In present invention, the tilted liquid crystal molecules at obscure position tends to be horizontally aligned, which (Continued)

increases the light transmittance at the obscure position and eliminates the obscure in the liquid crystal display panel and display.

4 Claims, 2 Drawing Sheets

(58) Field of Classification Search
CPC ............ G02F 1/1335; G02F 1/133514; G02F 1/134336; G02F 1/133512; G02F 1/133707; G02F 1/133711; G02F 1/1362; G02F 1/133305; G02F 1/1333; G02F 1/1343; G02F 2001/134372; G02F 2001/134318; G02F 2201/40; G02F 2201/52; G06F 3/0412; G06F 3/0488; G09G 2300/0426; G09G 3/3648
USPC ..... 349/43, 106, 139, 138, 33, 42, 143, 132, 349/141; 257/72
See application file for complete search history.

(56) References Cited

FOREIGN PATENT DOCUMENTS

| CN | 202563216 U | 11/2012 |
|----|-------------|---------|
| CN | 102819153 A | 12/2012 |
| CN | 103293791 A | 9/2013 |
| CN | 103364999 A | 10/2013 |
| CN | 203287662 U | 11/2013 |

* cited by examiner

LIQUID CRYSTAL DISPLAY PANEL AND DISPLAY

BACKGROUND OF THE INVENTION

1. Field of the Invention

The present invention relates to the field of liquid crystal displaying techniques, and in particular to a liquid crystal display panel.

2. The Related Arts

According to the direction of the electric field driving the liquid crystal, the liquid crystal display device is divided into a vertical electric field type liquid crystal display device and a horizontal electric field type liquid crystal display device. Vertical electric field type liquid crystal display device includes a twisted nematic (TN) mode and a vertical alignment (VA) mode. The horizontal electric field type liquid crystal display device includes an in-plane switching (IPS) mode, the fringe field switching (FFS) mode and advanced super-dimensional field switching (ADS) mode. With respect to the vertical electric field type liquid crystal display device, horizontal electric field type liquid crystal display device does not require additional optical compensation film to achieve wide viewing angle. However, for the horizontal electric field type liquid crystal display device, the electric field distribution in the liquid crystal layer thereof is uneven, which has field uncovered local area. The local area is not translucent, leading to overall low transmittance of the liquid crystal panel.

Therefore, for the above technical problems, it is necessary to provide a liquid crystal display panel and a display.

SUMMARY OF THE INVENTION

In order to solve the deficiencies of the prior art, the objective of the present invention is to provide a liquid crystal display panel and a display.

To achieve the above objective, the embodiment of the present invention provides a liquid crystal display panel, the display panel comprises a first substrate and a second substrate opposed to each other, and a liquid crystal layer located between the first substrate and the second substrate, a first common electrode and an insulating layer being sequentially provided on the side of the first substrate toward the second substrate, multiple first pixel electrodes being provided on the insulating layer, multiple second common electrodes and multiple second pixel electrodes being provided on the side of the second substrate toward the first substrate, the second common electrodes and the second pixel electrodes being provided at intervals.

As a further refinement of the invention, the first substrate is an array substrate, and the second substrate is a color filter substrate.

As a further refinement of the invention, the first pixel electrodes are arrayed at equal intervals on the insulating layer, and several horizontal electric fields are formed between the first common electrodes and the first pixel electrodes.

As a further refinement of the invention, the second common electrodes are arrayed at equal intervals on the second substrate.

As a further refinement of the invention, the interval between the two second common electrodes is equal to that between the two first pixel electrodes, and the second common electrodes and the first pixel electrodes are staggered in a vertical position.

As a further refinement of the invention, the second pixel electrodes are arrayed at equal intervals on the second substrate.

As a further refinement of the invention, the interval between the two second pixel electrodes is equal to that between the two first pixel electrodes, and the second pixel electrodes and the first pixel electrodes are staggered in a vertical position.

As a further refinement of the invention, the interval between the second pixel electrode and the second common electrode adjacent to each other is half of that between the two first pixel electrodes, the second pixel electrode and the second common electrode are distributed symmetrically along the located axis or the central axis of the adjacent first pixel electrode.

Correspondingly, a liquid crystal display comprises the above liquid crystal display panel.

The present invention adds the second pixel electrode and the second common electrode on the second substrate. The second pixel electrodes and the second common electrodes are staggered, and the horizontal electric fields are formed between the second pixel electrodes and the second common electrodes, so that the tilted liquid crystal molecules at obscure position tends to be horizontally aligned, which increases the light transmittance at the obscure position and eliminates the obscure in the liquid crystal display panel and display.

DETAILED DESCRIPTION OF THE PREFERRED EMBODIMENTS

In order to enable persons skilled in the art to better understand the technical solution of the present invention, in the following embodiments of the invention in conjunction with the accompanying drawings, embodiments of the present invention, the technical solutions clearly and completely described, obviously, the described embodiments are only part of the embodiments of the present invention, but not all of the implementation of the case. Based on the embodiment of the present invention, persons of ordinary skill in the art without creative efforts obtained under the premise that all other embodiments, all belong to the protection scope of the present invention.

Comparative Example 1

Figure 1:
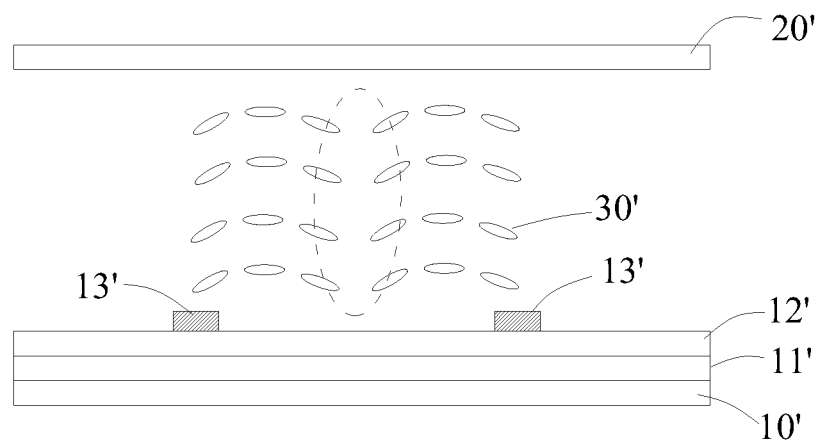
FIG. 1 is a schematic view illustrating the structure of the liquid crystal display panel according to the existing technology.

Referring to FIG. 1, the liquid crystal display panel according to the existing technology comprises a first substrate 10' and a second substrate 20' opposed to each other, and a liquid crystal layer 30' located between the first substrate and the second substrate. Wherein, the first substrate 10' is an array substrate, and the second substrate 20' is a color filter substrate. A first common electrode 11' and an insulating layer 12' are sequentially provided on the side of the first substrate 10' toward the second substrate 20'.

Multiple first pixel electrodes 13' are provided on the insulating layer 12', and the first pixel electrodes 13' are arrayed at equal intervals.

In this comparative example, the liquid crystal display panel is the boundary electric field switching mode, which is one kind of a horizontal electric field type liquid crystal display device. Horizontal electric fields are formed between the first pixel electrodes 13' on the first substrate 10' and the first common electrodes 11' blocked by the insulating layer 12'. But there will be tilt component of the horizontal electric field existing at the positions of the first pixel electrodes 13' and at the middle position of the two first pixel electrodes 13', so that the liquid crystal molecules at the positions of the first pixel electrodes 13' and at the middle position of the two first pixel electrodes 13' are also tilted, shown as dashed box in FIG. 1. The tilted liquid crystal molecules decrease the light transmittance, which forms obscurity.

Embodiment 1

Figure 2:
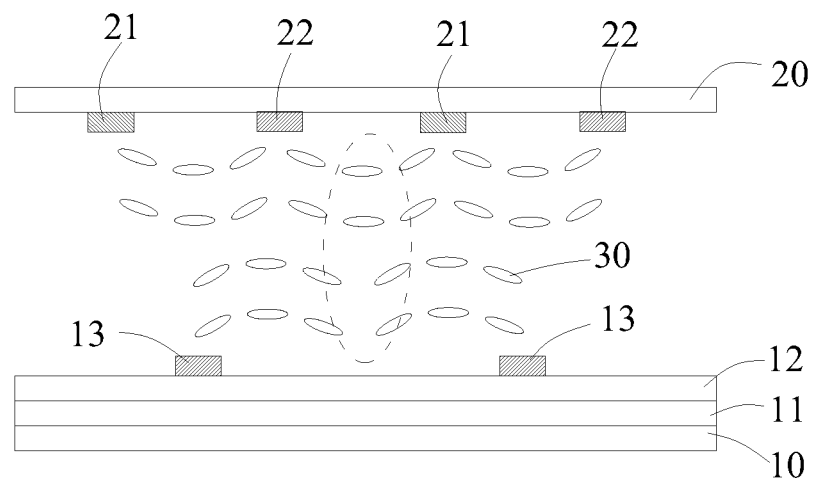
FIG. 2 is a schematic view illustrating the structure of the liquid crystal display panel according to the Embodiment 1 of the present invention.

Referring to FIG. 2, in the Embodiment 1 of the present invention, the liquid crystal display panel comprises a first substrate 10 and a second substrate 20 opposed to each other, and a liquid crystal layer 30 located between the first substrate and the second substrate.

Wherein, the first substrate 10 is an array substrate, and the second substrate 20 is a color filter substrate. A first common electrode 11 and an insulating layer 12 are sequentially provided on the side of the first substrate 10 toward the second substrate 20. Multiple first pixel electrodes 13 are provided on the insulating layer 12, and the first pixel electrodes 13 are arrayed at equal intervals.

Furthermore, multiple second common electrodes 21 and multiple second pixel electrodes 22 are provided on the side of the second substrate 20 toward the first substrate 10, and the second common electrodes 21 and the second pixel electrodes 22 are provided at intervals.

Specifically, in the present embodiment, the second common electrodes 21 and the second pixel electrodes 22 are arrayed at equal intervals on the second substrate 20. The second common electrodes 21 and the first pixel electrodes 13 are staggered in a vertical position, and the second pixel electrodes 22 and the first pixel electrodes 13 are also staggered in a vertical position, that is, there is no second common electrode or second pixel electrode on the second substrate 20 corresponding to the vertical position of the first pixel electrodes 13. Moreover, the interval between the two second pixel electrodes 21 is equal to that between the two first pixel electrodes 13, the interval between the two second pixel electrodes 22 is also equal to that between the two first pixel electrodes 13, and the interval between the second pixel electrode 21 and the second common electrode 22 adjacent to each other is half of that between the two first pixel electrodes 13. In the present embodiment, the second pixel electrode 22 and the second common electrode 21 are distributed symmetrically along the located axis or the central axis of the adjacent first pixel electrode 13.

The present invention adds the second pixel electrode and the second common electrode on the second substrate, which are specifically located at two sides of the obscure position as shown in Comparative Example 1. The second pixel electrode and the second common electrode are staggered, and a horizontal electrode field is formed between the second pixel electrode and the second common electrode, so that the tilted liquid crystal molecules at obscure position tends to be horizontally aligned. From the overall effect of FIG. 2, because of the design of the second pixel electrode and the second common electrode, the arrangement of the liquid crystal molecules close to the side of the color filter substrate are complementary to that close to the side of the array substrate, which can increase the light transmittance at the obscure position and then eliminate the obscure in Comparative Example 1.

Embodiment 2

Figure 3:
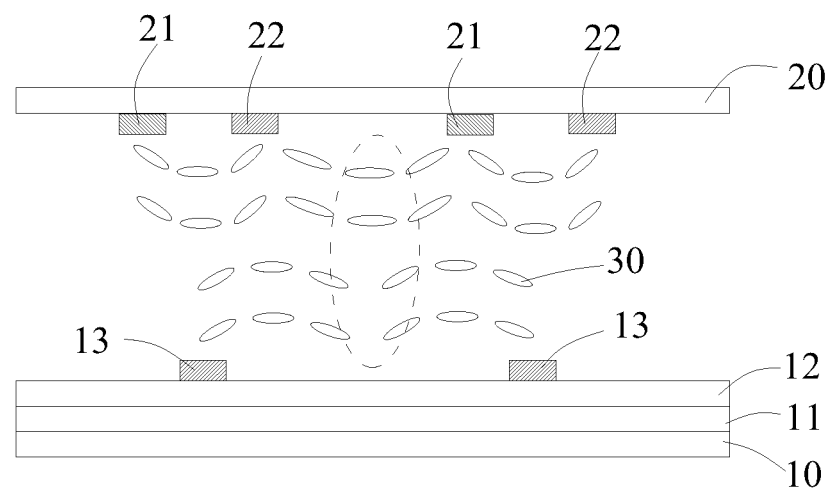
FIG. 3 is a schematic view illustrating the structure of the liquid crystal display panel according to the Embodiment 2 of the present invention.

Referring to FIG. 3, in the Embodiment 2 of the present invention, the liquid crystal display panel also comprises a first substrate 10 and a second substrate 20 opposed to each other, and a liquid crystal layer 30 located between the first substrate and the second substrate.

Wherein, the first substrate 10 is an array substrate, and the second substrate 20 is a color filter substrate. A first common electrode 11 and an insulating layer 12 are sequentially provided on the side of the first substrate 10 toward the second substrate 20. Multiple first pixel electrodes 13 are provided on the insulating layer 12, and the first pixel electrodes 13 are arrayed at equal intervals.

Multiple second common electrodes 21 and multiple second pixel electrodes 22 are provided on the side of the second substrate 20 toward the first substrate 10, and the second common electrodes 21 and the second pixel electrodes 22 are provided at intervals.

In the present embodiment, the second common electrodes 21 and the first pixel electrodes 13 are staggered in a vertical position, and the second pixel electrodes 22 and the first pixel electrodes 13 are also staggered in a vertical position, that is, there is no second common electrode or second pixel electrode on the second substrate 20 corresponding to the vertical position of the first pixel electrodes 13. The interval between the two second pixel electrodes 21 is equal to that between the two first pixel electrodes 13, and the interval between the two second pixel electrodes 22 is also equal to that between the two first pixel electrodes 13, but the interval between the second pixel electrode 21 and the second common electrode 22 adjacent to each other is not equal. In the present embodiment, the second pixel electrode 22 and the second common electrode 21 are distributed symmetrically along the located axis or the central axis of the adjacent first pixel electrode 13.

From the overall effect of FIG. 3, the arrangement of the liquid crystal molecules close to the side of the color filter substrate are complementary to that close to the side of the array substrate, which can increase the light transmittance at the obscure position and then eliminate the obscure in Comparative Example 1.

The above embodiments are only two preferred embodiments of the present invention, it should be understood that the various embodiments used to eliminate obscurity of the liquid crystal display panel and display through providing the second common electrodes and the second pixel electrodes on the color filter substrate belong to the scope of the present invention, which is not limited to the case of the above two embodiments. For example, in the other embodiments, the distance between the second pixel electrode and the second common electrode can be unequal, or the second common electrode and the second pixel electrode are not necessarily distributed symmetrically along the located axis or the central axis of the adjacent first pixel electrode, which is not going to illustrate.

The liquid crystal display panel/display according to the present invention is a horizontal electric field type liquid crystal display panel/display, such as IPS, FFS liquid crystal display panel/display, and etc.

As seen from the above technical solution, the present invention adds the second pixel electrode and the second common electrode on the second substrate. The second pixel electrodes and the second common electrodes are staggered, and the horizontal electric fields are formed between the second pixel electrodes and the second common electrodes, so that the tilted liquid crystal molecules at obscure position tends to be horizontally aligned, which increases the light transmittance at the obscure position and eliminates the obscure in the liquid crystal display panel and display.

For those skilled in the art, the present invention is clearly not limited to the exemplary embodiments of the details, and the present invention can be achieved in other specific forms without departing from the spirit or essential characteristics of the present invention. Therefore, whether from which viewpoints, it should be considered as an exemplary embodiment, but not limiting, the scope of the present invention is defined by the appended claims rather than the foregoing description define. Therefore, the present invention intends to include all changes which come within the meaning and range of equivalents of the elements. Any reference signs covered requirements in the claims should not be seen as the right to restrict.

Further, it should be understood that although the present specification are described according to the embodiments, but not every embodiment contains only a separate aspect. This narrative description is merely for the sake of clarity. Those skilled in the art should take the specification as a whole body, examples of the technical solutions of each embodiment may be appropriately combined to form other embodiments which can be understood by the skilled person.

What is claimed is:

1. A liquid crystal display panel, wherein, the display panel comprises a first substrate and a second substrate opposed to each other, and a liquid crystal layer located between the first substrate and the second substrate, a first common electrode and an insulating layer being sequentially provided on the side of the first substrate toward the second substrate, multiple first pixel electrodes being provided on the insulating layer, multiple second common electrodes and multiple second pixel electrodes being provided on the side of the second substrate toward the first substrate, the second common electrodes and the second pixel electrodes being provided at intervals;

wherein, the first pixel electrodes are arrayed at equal intervals on the insulating layer, and several horizontal electric fields are formed between the first common electrodes and the first pixel electrodes; the second common electrodes are arrayed at equal intervals on the second substrate;

wherein, the interval between the two second common electrodes is equal to that between the two first pixel electrodes, and the second common electrodes and the first pixel electrodes are staggered in a vertical position; and wherein the interval between the second pixel electrode and the second common electrode adjacent to each other is half of that between the two first pixel electrodes, the second pixel electrode and the second common electrode are distributed symmetrically along the located axis or the central axis of the adjacent first pixel electrode.

2. The liquid crystal display panel as claimed in claim 1, wherein the first substrate is an array substrate, and the second substrate is a color filter substrate.

3. The liquid crystal display panel as claimed in claim 1, wherein the second pixel electrodes are arrayed at equal intervals on the second substrate.

4. The liquid crystal display panel as claimed in claim 3, wherein the interval between the two second pixel electrodes is equal to that between the two first pixel electrodes, and the second pixel electrodes and the first pixel electrodes are staggered in a vertical position.

\* \* \* \* \*